(12) United States Patent
Jeong et al.

(10) Patent No.: US 11,223,076 B2
(45) Date of Patent: Jan. 11, 2022

(54) BATTERY PACK

(71) Applicant: Samsung SDI Co., Ltd., Yongin-si (KR)

(72) Inventors: Hyeoncheol Jeong, Yongin-si (KR); Jaeseung Kim, Yongin-si (KR); Junseop Kim, Yongin-si (KR); Kyungrae Pyo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 331 days.

(21) Appl. No.: 16/479,812

(22) PCT Filed: Nov. 1, 2017

(86) PCT No.: PCT/KR2017/012211
§ 371 (c)(1),
(2) Date: Jul. 22, 2019

(87) PCT Pub. No.: WO2018/139738
PCT Pub. Date: Aug. 2, 2018

(65) Prior Publication Data
US 2021/0328279 A1    Oct. 21, 2021

(30) Foreign Application Priority Data
Jan. 26, 2017   (KR) .................. 10-2017-0012974

(51) Int. Cl.
*H01M 10/48*     (2006.01)
*H01M 10/653*    (2014.01)
(Continued)

(52) U.S. Cl.
CPC .......... *H01M 10/486* (2013.01); *G01K 1/143* (2013.01); *G01K 7/22* (2013.01); *H01M 10/425* (2013.01);
(Continued)

(58) Field of Classification Search
CPC ............ H01M 10/486; H01M 10/482; H01M 50/569; H01M 50/581; H01M 10/653;
(Continued)

(56) References Cited

U.S. PATENT DOCUMENTS 6,948,078 B2    9/2005   Odaohhara
8,916,278 B2   12/2014   Kim et al.
(Continued)

FOREIGN PATENT DOCUMENTS

EP    2284931 A1       2/2011
JP    2002-163038 A    6/2002
(Continued)

OTHER PUBLICATIONS

International Search Report for International Application No. PCT/KR2017/012211, dated Feb. 5, 2018, 3pp.
(Continued)

*Primary Examiner* — Christopher P Domone
(74) *Attorney, Agent, or Firm* — Lewis Roca Rothgerber Christie LLP

(57) ABSTRACT

The present disclosure provides a battery pack including: a plurality of battery cells; a protective circuit module arranged on a side of the plurality of battery cells and including at least one through-hole; an electrode tab inserted into the at least one through-hole and electrically connecting the plurality of battery cells to the protective circuit module; a temperature sensing unit arranged on the protective circuit module; and a heat transfer member connected to a portion of the electrode tab inserted into the at least one through-hole and to the temperature sensing unit and transferring heat from the electrode tab to the temperature sensing unit.

11 Claims, 5 Drawing Sheets

(51) Int. Cl.
*H01M 10/655* (2014.01)
*H01M 50/569* (2021.01)
*G01K 1/143* (2021.01)
*G01K 7/22* (2006.01)
*H01M 10/42* (2006.01)

(52) U.S. Cl.
CPC ....... *H01M 10/482* (2013.01); *H01M 10/653* (2015.04); *H01M 10/655* (2015.04); *H01M 50/569* (2021.01); *H01M 2010/4271* (2013.01)

(58) Field of Classification Search
CPC ........... H01M 10/655; H01M 10/6554; H01M 10/425; H01M 2010/4271; H01M 2010/4278
See application file for complete search history.

(56) References Cited

U.S. PATENT DOCUMENTS

| | | | |
|---|---|---|---|
| 8,980,452 B2 | 3/2015 | Hong et al. | |
| 9,198,292 B2 | 11/2015 | Kim et al. | |
| 9,269,946 B2 | 2/2016 | Lee | |
| 9,496,587 B2 | 11/2016 | Jung | |
| 9,786,962 B2 | 10/2017 | Ahn et al. | |
| 2010/0098974 A1* | 4/2010 | Kim | H01M 50/15 429/7 |
| 2010/0136392 A1* | 6/2010 | Pulliam | G01K 1/026 429/90 |
| 2011/0039134 A1* | 2/2011 | Kim | H01M 10/653 429/7 |
| 2012/0106015 A1 | 5/2012 | Kwak et al. | |
| 2013/0302651 A1 | 11/2013 | Kim et al. | |
| 2015/0017503 A1 | 1/2015 | Wang et al. | |
| 2015/0263389 A1 | 9/2015 | Moon | |
| 2016/0093920 A1 | 3/2016 | Lee | |

FOREIGN PATENT DOCUMENTS

| | | |
|---|---|---|
| JP | 2005-124329 A | 5/2005 |
| JP | 5481309 B2 | 4/2014 |
| JP | 2014-116329 A | 6/2014 |
| JP | 2014-127418 A | 7/2014 |
| KR | 10-2011-0016821 A | 2/2011 |
| KR | 10-2012-0059951 A | 6/2012 |
| KR | 10-1210088 B1 | 12/2012 |
| KR | 10-1261769 B1 | 5/2013 |
| KR | 10-1289610 B1 | 7/2013 |
| KR | 10-2014-0063205 A | 5/2014 |
| KR | 10-2015-0065280 A | 6/2015 |
| KR | 10-2015-0107475 A | 9/2015 |
| KR | 10-2016-0037575 A | 4/2016 |
| KR | 10-1629497 B1 | 6/2016 |
| KR | 10-1698765 B1 | 1/2017 |

OTHER PUBLICATIONS

EPO Extended Search Report dated Oct. 15, 2020, issued in corresponding European Patent Application No. 17893848.6 (7 pages).
Korean Office Action dated Mar. 18, 2021, issued in corresponding Korean Patent Application No. 10-2017-0012974 (6 pages).
Korean Notice Of Allowance dated Nov. 16, 2021, issued in corresponding Korean Patent Application No. 10-2017-0012974 (2 pages).

* cited by examiner

BATTERY PACK

CROSS-REFERENCE TO RELATED APPLICATION(S)

This application is a National Phase Patent Application of International Patent Application Number PCT/KR2017/012211, filed on Nov. 1, 2017, which claims priority of Korean Patent Application No. 10-2017-0012974, filed Jan. 26, 2017. The entire contents of both of which are incorporated herein by reference.

TECHNICAL FIELD

Embodiments of the present disclosure relate to a battery pack, and more particularly, to a battery pack configured to prevent overheating by stably sensing the temperature of battery cells.

BACKGROUND ART

Recently, with the rapid development of industries such as electronics and communication, the spread of mobile electronic devices has increased. Secondary batteries are widely used as power sources of mobile electronic devices in view of economical efficiency.

In addition, secondary batteries may be used not only in cellular phones or laptop computers, but also in medium to large-sized devices such as power tools, electric bikes, and automobiles that require high output power and a large amount of electricity. For such a device requiring high output power and a large amount of electricity, a battery pack in which a plurality of secondary batteries are connected in series or parallel to function as a single power source may be used.

Such a battery pack including a plurality of secondary batteries is provided with various protective devices for safety. A thermistor, which is a kind of protective device used for measuring temperatures, may measure the temperature of a battery pack when the temperature of the battery pack sharply rises before the battery pack overheats or catches on fire, and may transmit results of the measurement to a protective circuit module such that current flowing in the battery pack may be interrupted.

DESCRIPTION OF EMBODIMENTS

Technical Problem

However, battery packs of the related art have a problem in that a wire-type thermistor used as a protective device for measuring the temperature of battery cells or a wire used to connect a thermistor and an object to be measured could be partially damaged or fully cut. In addition, there is another problem in that an additional process is required to fix such a wire.

The present disclosure is proposed to solve various problems including the above-described problems, and an objective of the present disclosure is to provide a battery pack configured to prevent overheating by stably sensing the temperature of battery cells. However, this objective is an example, and the scope of the present disclosure is not limited thereto.

Solution to Problem

Embodiments of the present disclosure provide battery packs.

According to an aspect of the present disclosure, a battery pack includes: a plurality of battery cells; a protective circuit module arranged on a side of the plurality of battery cells and including at least one through-hole; an electrode tab inserted into the at least one through-hole and electrically connecting the plurality of battery cells to the protective circuit module; a temperature sensing unit arranged on the protective circuit module; and a heat transfer member connected to a portion of the electrode tab inserted into the at least one through-hole and to the temperature sensing unit and transferring heat from the electrode tab to the temperature sensing unit.

Advantageous Effects of Disclosure

As described above, according to an embodiment of the present disclosure, the temperature of the battery cells may be stably sensed to prevent overheating of the battery pack.

In addition, the number of processes for assembling components for temperature sensing may be reduced.

In addition, it is possible to simultaneously sense temperatures at a plurality of positions of the battery pack.

However, the scope of the present disclosure is not limited to these effects.

BEST MODE

Figure 1:
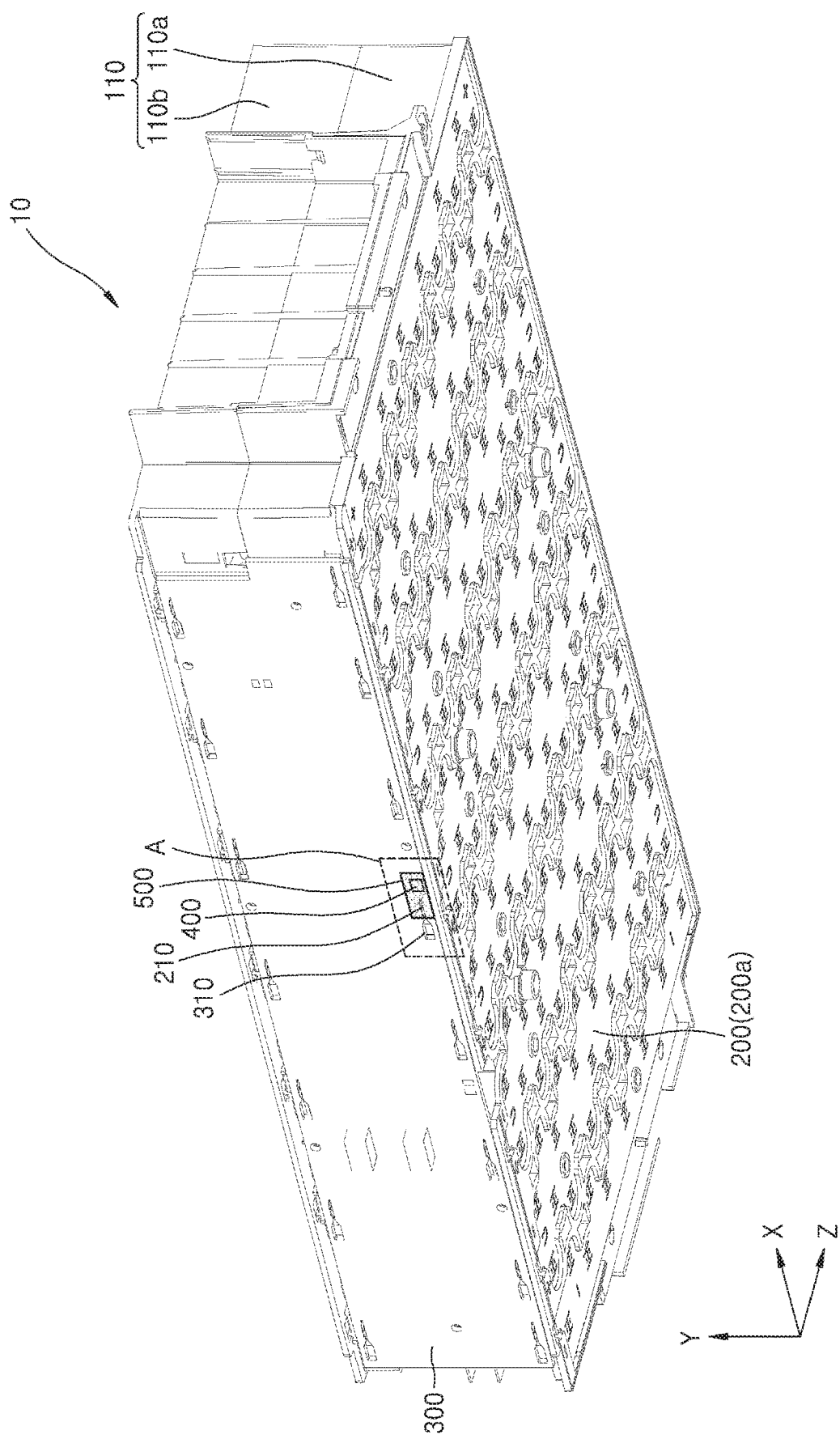
FIG. 1 is a perspective view schematically illustrating a battery pack according to an embodiment of the present disclosure.

According to an aspect of the present disclosure, a battery pack includes: a plurality of battery cells; a protective circuit module arranged on a side of the plurality of battery cells and including at least one through-hole; an electrode tab inserted into the at least one through-hole and electrically connecting the plurality of battery cells to the protective circuit module; a temperature sensing unit arranged on the protective circuit module; and a heat transfer member connected to a portion of the electrode tab inserted into the at least one through-hole and to the temperature sensing unit and transferring heat from the electrode tab to the temperature sensing unit.

The heat transfer member may be arranged to cover the at least one through-hole and the temperature sensing unit.

The temperature sensing unit may include a temperature sensor, a body supporting the temperature sensor, and a terminal transmitting information sensed by the temperature sensor to the protective circuit module, and the temperature sensor may be arranged on a surface of the temperature sensing unit which is in contact with the heat transfer member.

The heat transfer member may be formed of a heat transfer material including thermal silicone or thermal grease.

The heat transfer member may be formed by applying the heat transfer material or formed as a tape including the heat transfer material.

At least some of the plurality of battery cells may be arranged in one direction in such a manner that lateral surfaces of neighboring battery cells are adjacent to each other.

The protective circuit module may extend along the lateral surfaces of the battery cells in the one direction.

The electrode tab may be perpendicular to the protective circuit module, and an end of the electrode tab may be bent toward the protective circuit module.

The at least one through-hole may be located in an edge region of the protective circuit module, the edge region being adjacent to the electrode tab.

The protective circuit module may include a first through-hole and a second through-hole, wherein the first through-hole may be located in a central region of the protective circuit module, and the second through-hole may be located in a peripheral region of the protective circuit module.

The temperature sensing unit may include a first temperature sensing unit adjacent to the first through-hole and a second temperature sensing unit adjacent to the second through-hole, wherein the first temperature sensing unit may sense higher temperatures than the second temperature sensing unit.

The temperature sensing unit may include a chip thermistor.

MODE OF DISCLOSURE

The present disclosure may have diverse modified embodiments, and some embodiments are illustrated in the drawings and are described in the detailed description of the present disclosure. However, it will be understood that the present disclosure is not limited to the embodiments and includes all modifications, equivalents, and replacements within the idea and technical scope of the present disclosure. Moreover, detailed descriptions related to well-known functions or configurations will be omitted in order not to unnecessarily obscure subject matters of the present disclosure.

It will be understood that although the terms "first," "second," etc. may be used herein to describe various elements, these elements should not be limited by these terms. These terms are only used to distinguish one element from another.

It will be understood that when a layer, a film, a region, or a plate is referred to as being "on" or "above" another layer, film, region, or plate, it can be directly on the other layer, film, region, or plate, or intervening layers, films, regions, or plates may also be present.

In the present disclosure, X, Y, and Z axes are not limited to the definition of the Cartesian coordinate system but may be differently defined or construed. For example, the X-axis, the X-axis, and the Z-axis may be perpendicular to one another, or may represent different directions that are not perpendicular to one another.

Hereinafter, embodiments of the present disclosure will be described in detail with reference to the accompanying drawings. In the drawings, like reference numerals denote like elements, and overlapping descriptions thereof will be omitted. In the drawings, the thicknesses of layers and regions are illustrated on an enlarged scale for clarity. In addition, the thicknesses of some layers and regions are exaggerated for ease of illustration.

Figure 2:
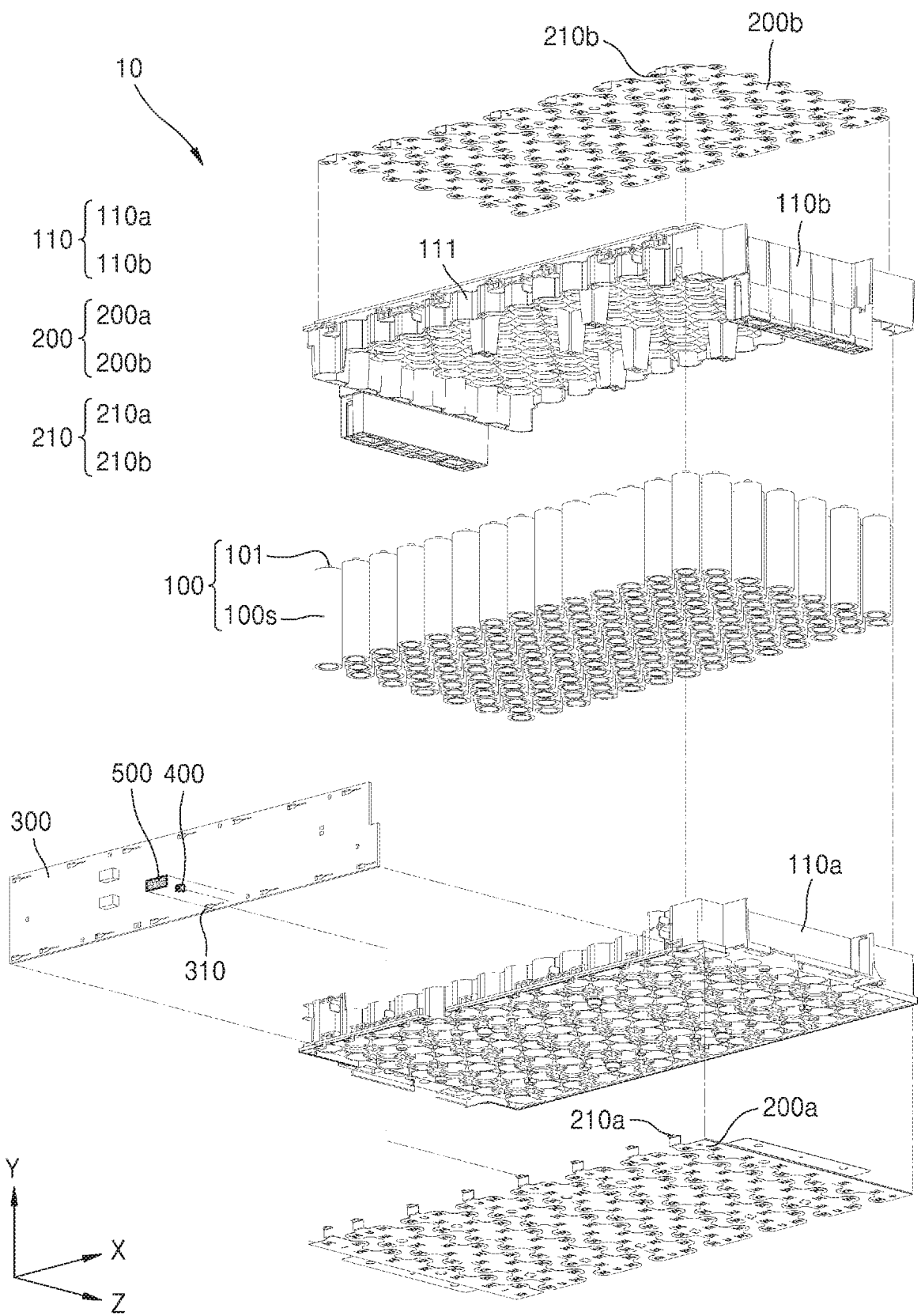
FIG. 2 is an exploded perspective view illustrating the battery pack shown in FIG. 1.

FIG. 1 is a perspective view schematically illustrating a battery pack 10 according to an embodiment of the present disclosure, and FIG. 2 is an exploded perspective view illustrating the battery pack 10 shown in FIG. 1.

Referring to FIGS. 1 and 2, the battery pack 10 of the embodiment of the present disclosure includes a plurality of battery cells 100, an electrode tab 200, a protective circuit module 300, a temperature sensing unit 400, a heat transfer member 500.

The battery cells 100 are arranged in the battery pack 10. Here, the battery cells 100 may be secondary battery cells that are rechargeable, for example, lithium ion battery cells or lithium polymer battery cells.

The battery cells 100 are connected in series or parallel to each other and are accommodated in a cell holder 110. Specifically, the cell holder 110 may have a plurality of cell spaces for accommodating the battery cells 100 respectively, and the cell spaces may be shaped according to the shape of the battery cells 100. For example, when the battery cells 100 have a cylindrical shape as shown in FIG. 2, the cell spaces may also have a cylindrical shape.

In an embodiment, the cell holder 110 may include a pair of first cell holder 110a and a second cell holder 110b that are configured to be coupled to each other in mutually-facing directions in a state in which the battery cells 100 are inserted in the first and second cell holders 110a and 110b. The first cell holder 110a and the second cell holder 110b include the above-described cell spaces and barrier walls 111 surrounding the cell spaces, respectively. Thus, the battery cells 100 may be regularly arranged in rows and columns in a state in which the battery cells 100 adjacent to each other are separated by the barrier walls 111.

The cell holder 110 may be arranged to surround some portions of the lateral surfaces 100s of the battery cells 100. For example, the cell holder 110 may surround both end electrode portions of each the battery cells 100. In various embodiments of the present invention, the cell holder 110 may entirely covers lateral surfaces 100s of the battery cells 100.

In addition, the shape and arrangement of the battery cells 100 shown in FIGS. 1 and 2 are merely examples, and various modifications may be made therein according to designs. For ease of illustration, the following description will be given mainly for the case in which the battery cells 100 are cylindrical cells.

The electrode tab 200 is arranged on electrodes 101 of the battery cells 100. Specifically, the electrode tab 200 is arranged to cover the electrodes 101 of the battery cells 100 exposed from the cell holder 110.

Different electrodes may be formed on both ends of each of the battery cells 100, and the electrodes 101 of the battery cells 100 may be exposed from the first cell holder 110a and the second cell holder 110b. The electrodes 101 of the battery cells 100 that are exposed as described above may be electrically connected to each other through the electrode tab 200 such that the battery cells 100 may be electrically connected in series, parallel, or series-parallel to each other to provide electrical output power that the battery pack 10 is required to have. Therefore, the electrode tab 200 may be formed of a conductive material such as nickel (Ni), copper (Cu), or aluminum (Al).

The electrode tab 200 may include a first electrode tab 200a arranged on a lower surface of the cell holder 110 and a second electrode tab 200b arranged on an upper surface the cell holder 110. Therefore, the first electrode tab 200a may connect together electrodes that are formed on ends of the battery cells 100 and are exposed from the first cell holder 100*a*, and the second electrode tab 200*b* may connect together electrodes that are formed on the other ends of the battery cells 100 and are exposed from the second cell holder 100*b*. In this case, the first electrode tab 200*a* and the second electrode tab 200*b* may alternately connect the electrodes at the ends and the other ends of the battery cells 100 such that battery cells 100 arranged in neighboring rows may be connected in series to each other.

The electrical connection of the battery cells 100 shown in FIGS. 1 and 2 is merely an example. That is, series, parallel, or series-parallel connection methods may be variously applied according to required electrical output power.

In addition, a bent portion 210 is provided on an end of the electrode tab 200. Specifically, the first electrode tab 200*a* and the second electrode tab 200*b* respectively include a bent portion 210*a* and a bent portion 210*b* that are bent toward the protective circuit module 300 (described later). In this case, both the first and second electrode tabs 200*a* and 200*b* are coupled to the protective circuit module 300 through the first and second bent portions 210*a* and 210*b* such that the battery cells 100 may be electrically connected to the protective circuit module 300. In addition, the specific shape of the bent portion 210 and the method for connecting the bent portion 210 and the protective circuit module 300 to each other will be described later with reference to FIG. 3.

The protective circuit module 300 is arranged on a side of the battery cells 100. Specifically, the protective circuit module 300 may extend along the lateral surfaces 100*s* of the battery cells 100 in a first direction (+X direction). Here, the first direction (+X direction) refers to a direction in which the battery cells 100 are arranged, and in this case, the battery cells 100 may be arranged in such a manner that the lateral surfaces 100*s* of the battery cells 100 are adjacent to each other.

The protective circuit module 300 may be coupled to the bent portion 210 of the electrode tab 200, and thus the protective circuit module 300 may be approximately perpendicular to the electrode tab 200.

One of the most important roles of the protective circuit module 300 is to prevent overcharge or overdischarge of the battery cells 100. For example, when the battery cells 100 are overcharged, an electrolyte contained in the battery cells 100 may decompose and generate gas. The gas may increase the internal pressure of the battery cells 100, and when leakage of the electrolyte from the battery cells 100 severely occurs due to the increase of the internal pressure of the battery cells 100, the battery cells 100 may catch on fire or explode.

In addition, when the battery cells 100 are overdischarged, negative electrodes of the battery cells 100 may be damaged, and when the negative electrodes of the battery cells 100 are damaged, the charge-discharge performance of the battery cells 100 markedly decreases.

Therefore, the protective circuit module 300 may prevent such overcharge or overdischarge of the battery cells 100, and in addition to this, when there is an urgent situation in which the temperature of the battery pack 10 rapidly increases, the protective circuit module 300 may interrupt current flowing in the battery pack 10.

To effectively perform the above-described protection functions, a temperature sensing unit 400 for sensing the temperature of the battery cells 100 is arranged on a surface of the protective circuit module 300. Therefore, the protective circuit module 300 may receive information about the temperature of the battery cells 100 sensed by the temperature sensing unit 400 and may control the charge and discharge operations of the battery cells 100 based on the temperature information.

In an embodiment, the temperature sensing unit 400 may include a chip thermistor. Since it is possible to simply couple the chip thermistor to a circuit board of the protective circuit module 300 by a solder mounting method in which solder is applied, the total number of processes may be reduced. In addition, it is possible to automate the solder mounting method, and tools such as a jig are not necessary to fix the protective circuit module 300, thereby simplifying manufacturing processes. The specific shape and structure of the temperature sensing unit 400 will be described later with reference to FIG. 4.

The temperature sensing unit 400 includes a thermistor such as a negative temperature coefficient (NTC) thermistor having electrical resistance decreasing as the temperature of the battery cells 100 increases due to a negative temperature coefficient, or a positive temperature coefficient (PTC) thermistor having electrical resistance increasing as the temperature of the battery cells 100 increases. Since the resistance of the temperature sensing unit 400 sensitively varies with the temperature of the battery cells 100, the protective circuit module 300 may control the charge and discharge operations of the battery cells 100 in real time by using the temperature sensing unit 400.

A member connecting the temperature sensing unit 400 to the battery cells 100 is necessary for the temperature sensing unit 400 to sense the temperature of the battery cells 100. As such a connecting member, parts such as wires may be used. However, when wires are directly connected to the battery cells 100, the wires may be easily damaged or broken due to bending or the like. Therefore, it is necessary to stably connect the temperature sensing unit 400 to the battery cells 100 using a flat surface. To this end, the electrode tab 200 is used in the present disclosure.

Specifically, a heat transfer member 500 may be arranged between the temperature sensing unit 400 and the bent portion 210 of the electrode tab 200 to which the protective circuit module 300 is coupled, and thus temperature sensing may be performed using an approximately flat surface of the protective circuit module 300. Thus, since heat is transferred from the bent portion 210 to the temperature sensing unit 400 through the heat transfer member 500, the temperature sensing unit 400 may easily sense the temperature of the battery cells 100.

The heat transfer member 500 may have a thin film shape to make surface contact with the bent portion 210 of the electrode tab 200 and the temperature sensing unit 400. As a result, heat transfer from the electrode tab 200 to the temperature sensing unit 400 may effectively occur, and durability problems occurring when a wire-type connection member is used may be prevented.

The heat transfer member 500 may include thermal silicone or thermal grease as a heat transfer material. In this case, the heat transfer member 500 may be formed in various manners, for example, by applying the heat transfer material or as a tape including the heat transfer material.

Figure 3:
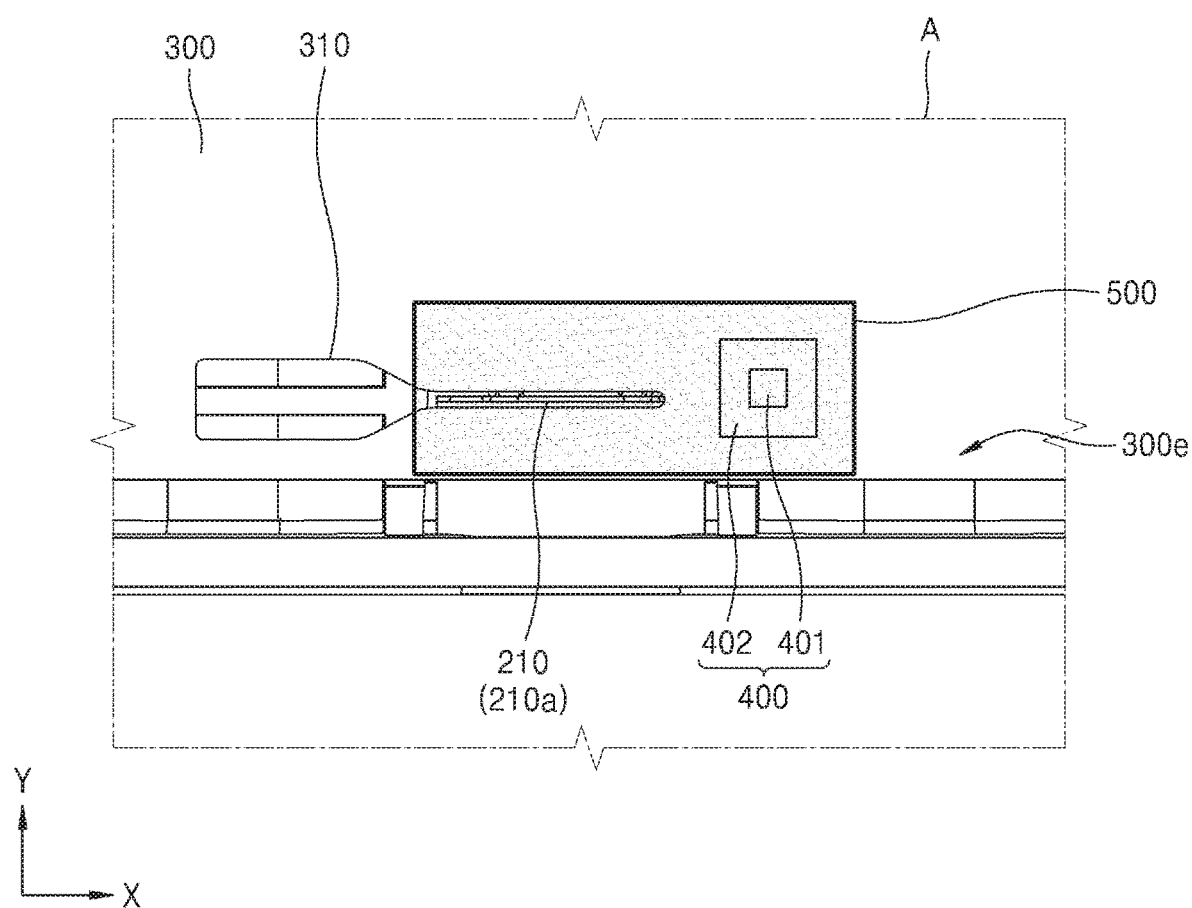
FIG. 3 is a plan view of portion A in FIG. 1.
Figure 4:
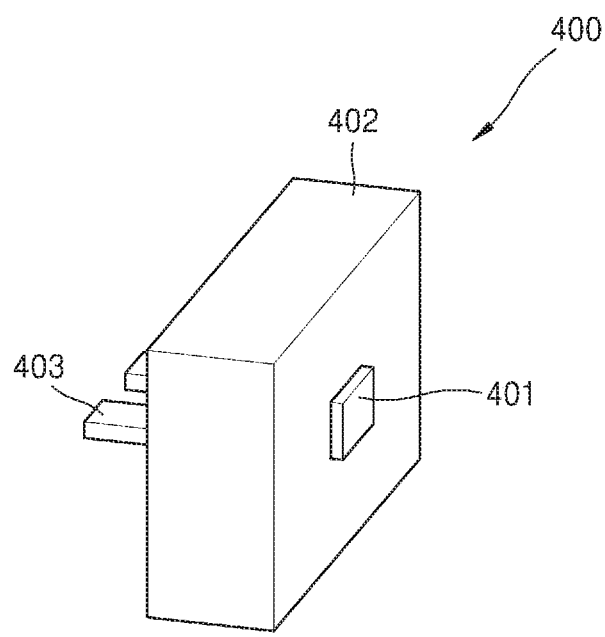
FIG. 4 is a perspective view schematically illustrating a temperature sensing unit according to an embodiment of the present disclosure.

FIG. 3 is a plan view of a portion A of FIG. 1, and FIG. 4 is a perspective view illustrating the temperature sensing unit 400 according to an embodiment of the present disclosure.

First, referring to FIG. 3, at least one through-hole 310 is formed in the protective circuit module 300. The at least one through-hole 310 may be located in an edge region of the protective circuit module 300, and it may be understood that the at least one through-hole 310 is located in an edge region 300e of the protective circuit module 300 which is adjacent to the electrode tab 200, specifically adjacent to the bent portion 210 of the electrode tab 200. The edge region 300e may extend in the first direction (+X direction) that is perpendicular to an electrode connection direction (+Z direction) of the electrode tab 200.

The electrode tab 200 is coupled to the protective circuit module 300 through the through-hole 310. Specifically, an end of the bent portion 210 bent toward the protective circuit module 300 may be inserted into the through-hole 310 and may be welded or soldered to a lower surface of the protective circuit module 300.

The through-hole 310 may have various shapes such as a circular shape, an elliptical shape, or a polygonal shape. In an embodiment, the through-hole 310 may have a slit shape having a width smaller than the length thereof. In this case, the through-hole 310 may extend in the first direction (+X direction) along the edge region 300e, For ease of illustration, the following description will be given mainly for the case in which the through-hole 310 is a slit extending in the first direction (+X direction).

The temperature sensing unit 400 is arranged on the protective circuit module 300 at a position adjacent to the through-hole 310. In an embodiment, as shown in FIG. 3, the temperature sensing unit 400 may be spaced apart from the through-hole 310 substantially in the first direction (+X direction) which is the length direction of the through-hole 310.

Referring to FIG. 4 together with FIG. 3, the temperature sensing unit 400 may include a chip thermistor including a temperature sensor 401, a body 402, and a terminal 403.

The temperature sensor 401 may be a unit for sensing variations in resistance according to the temperature of a target object, and may be arranged on an upper surface of the body 402. The body 402 is a portion supporting and reinforcing the temperature sensor 401, and the terminal 403 is connected to a lower surface of the body 402. The terminal 403 is a portion transmitting information sensed by the temperature sensor 401 to the protective circuit module 300, and to this end, the terminal 403 may be mounted on the protective circuit module 300 by a solder mounting method or the like.

Referring again to FIG. 3, the heat transfer member 500 may be arranged on the protective circuit module 300 to cover the temperature sensing unit 400 and the through-hole 310. Thus, the bent portion 210 of the electrode tab 200 exposed through the through-hole 310 is in contact with an end of the heat transfer member 500, and the temperature sensor 401 of the temperature sensing unit 400 is in contact with the other end of the heat transfer member 500. Thus, heat may be transferred from the electrode tab 200 to the temperature sensing unit 400 through the heat transfer member 500. In particular, it may be preferable that the temperature sensor 401 be arranged on the upper surface of the body 402 such that the temperature sensor 401 may be directly in contact with the heat transfer member 500 for rapid transfer of heat from the electrode tab 200 to the temperature sensor 401.

For effectiveness in the above-described heat transfer, the heat transfer member 500 may have a relatively wide area to entirely cover the temperature sensing unit 400 and the through-hole 310 and may be formed of a material having high thermal conductivity such as thermal silicone or thermal grease as described above.

Figure 5:
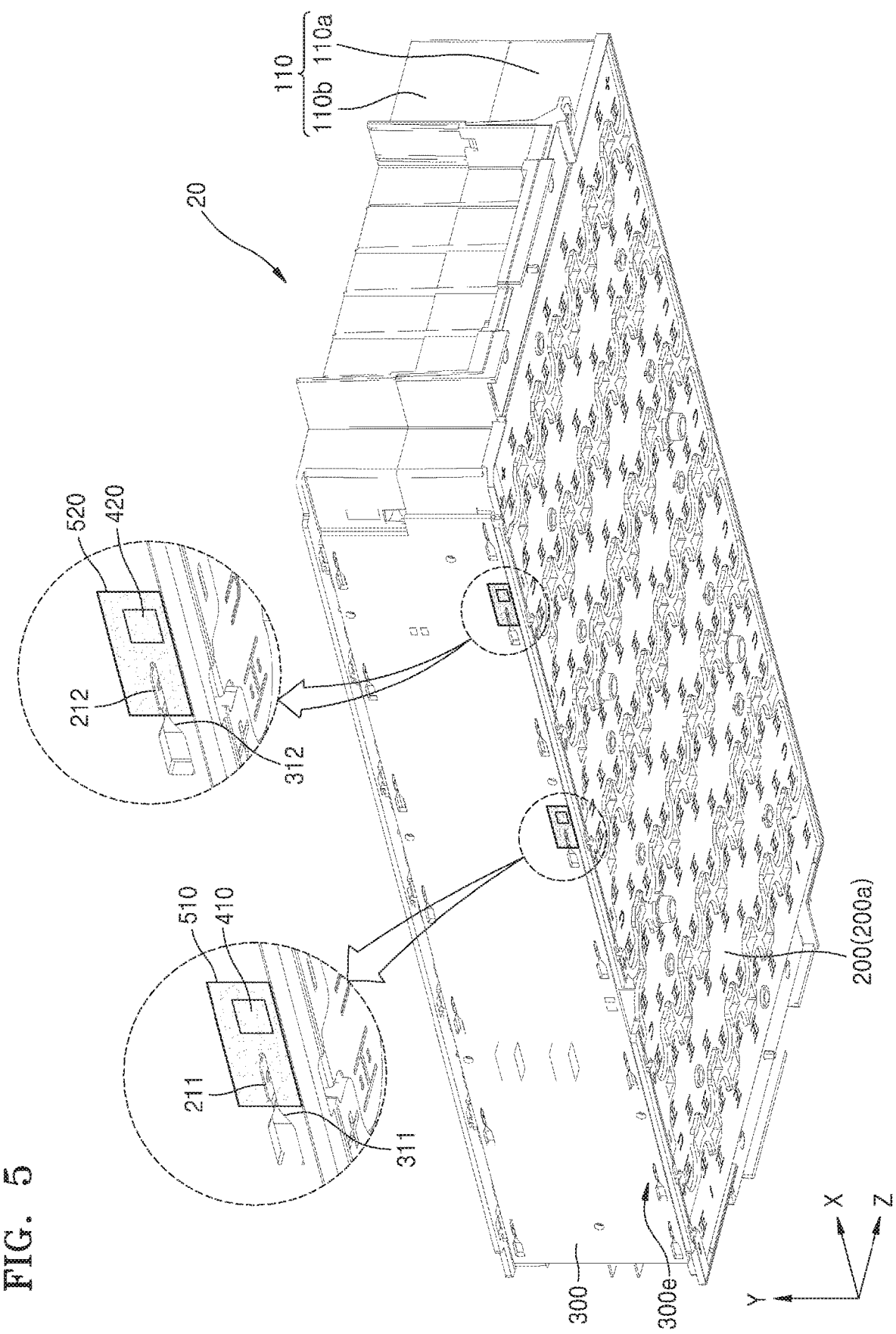
FIG. 5 is a perspective view schematically illustrating a battery pack according to another embodiment of the present disclosure.

FIG. 5 is a perspective view schematically illustrating a battery pack 20 according to another embodiment of the present disclosure.

The embodiment shown in FIG. 5 is the same as or similar to the previous embodiments shown in FIG. 1, etc. and modifications thereof except that a plurality of temperature sensing units 400 are used. Therefore, the embodiment shown in FIG. 5 will now be described in detail by focusing on differences from the embodiments shown in FIG. 1, etc.

A first through-hole 311 and a second through-hole 312 are formed in a protective circuit module 300. The first through-hole 311 and the second through-hole 312 may be located in an edge region of the protective circuit module 300, and as described above, it may be understood that the edge region is an edge region 300e adjacent to a bent portion 210 of an electrode tab 200.

In an embodiment, the first through-hole 311 may be located in a central region of the protective circuit module 300, and the second through-hole 312 may be located in a peripheral region of the protective circuit module 300. In this case, a first temperature sensing unit 410 is arranged corresponding to the first through-hole 311, and a second temperature sensing unit 420 is arranged corresponding to the second through-hole 312. In addition, a bent portion 211 of an electrode tab 200 located in a central region of the battery pack 20 is inserted into the first through-hole 311, and a bent portion 212 of an electrode tab 200 located in a peripheral region of the battery pack 20 is inserted into the second through-hole 312.

That is, the first temperature sensing unit 410 senses the temperature of the electrode tab 200 connecting electrodes of battery cells 100 located in the central region of the battery pack 20, and the second temperature sensing unit 420 senses the temperature of the electrode tab 200 connecting electrodes of battery cells 100 located in the peripheral region the battery pack 20.

When the battery pack 20 is operated, the temperature of the battery cells 100 located in the central region of the battery pack 20 rapidly increases due to a relatively large amount of heat generation, and the temperature of the battery cells 100 located in the peripheral region of the battery pack 20 does not markedly increase due to a relatively small amount of heat generation. Therefore, it may be preferable that the temperature sensing range of the first temperature sensing unit 410 be wider than the temperature sensing range of the second temperature sensing unit 420.

The first temperature sensing unit 410 and the second temperature sensing unit 420 include chip thermistors. In this case, since the temperature sensing range of chip thermistors is not wide in general, the first temperature sensing unit 410 and the second temperature sensing unit 420 may have different types of chip thermistors. That is, the first temperature sensing unit 410 may include a high-temperature-type chip thermistor, and the second temperature sensing unit 420 may include a low-temperature-type chip thermistor.

In addition, a first heat transfer member 510 is arranged to cover the first through-hole 311 and the first temperature sensing unit 410, and a second heat transfer member 520 is arranged to cover the second through-hole 312 and the second temperature sensing unit 420.

The embodiment shown in FIG. 5 is merely an example. Factors such as the number and positions of temperature sensing units and the types of thermistors may be variously selected according to the necessity of the temperature sensing.

As described above, according to the one or more of the above embodiments of the present disclosure, the temperature of the battery cells may be stably sensed to prevent overheating of the battery pack, and the temperature of the battery pack may be sensed at a plurality of positions at the same time. In addition, the number of processes for assembling components for temperature sensing may be reduced.

While embodiments of the present disclosure have been described with reference to the accompanying drawings, these embodiments are for illustrative purposes only, and it will be understood by those of ordinary skill in the art that various changes and modifications may be made therefrom. Therefore, the scope and spirit of the present disclosure should be defined by the following claims.

INDUSTRIAL APPLICABILITY

An embodiment of the present disclosure provides a battery pack configured to prevent overheating by stably sensing the temperature of battery cells, and the battery pack may be used as an energy source for a mobile device, an electric vehicle, a hybrid vehicle, or other electric devices. The battery pack may be various modified according to the types of devices to which the battery pack is applied.

The invention claimed is:

1. A battery pack comprising:
a plurality of battery cells;
a protective circuit module arranged on a side of the plurality of battery cells and comprising at least one through-hole;
an electrode tab inserted into the at least one through-hole and electrically connecting the plurality of battery cells to the protective circuit module;
a temperature sensing unit arranged on the protective circuit module; and
a heat transfer member connected to a portion of the electrode tab inserted into the at least one through-hole and to the temperature sensing unit and transferring heat from the electrode tab to the temperature sensing unit, wherein the heat transfer member is arranged to cover the at least one through-hole and the temperature sensing unit.

2. The battery pack of claim 1, wherein the temperature sensing unit comprises a temperature sensor, a body supporting the temperature sensor, and a terminal transmitting information sensed by the temperature sensor to the protective circuit module, and the temperature sensor is arranged on a surface of the temperature sensing unit which is in contact with the heat transfer member.

3. The battery pack of claim 1, wherein the heat transfer member is formed of a heat transfer material comprising thermal silicone or thermal grease.

4. The battery pack of claim 3, wherein the heat transfer member is formed by applying the heat transfer material or formed as a tape comprising the heat transfer material.

5. The battery pack of claim 1, wherein at least some of the plurality of battery cells are arranged in one direction in such a manner that lateral surfaces of neighboring battery cells are adjacent to each other.

6. The battery pack of claim 5, wherein the protective circuit module extends along the lateral surfaces of the battery cells in the one direction.

7. The battery pack of claim 1, wherein the electrode tab is perpendicular to the protective circuit module, and an end of the electrode tab is bent toward the protective circuit module.

8. The battery pack of claim 1, wherein the at least one through-hole is located in an edge region of the protective circuit module, the edge region being adjacent to the electrode tab.

9. The battery pack of claim 1, wherein the protective circuit module comprises a first through-hole and a second through-hole, and
the first through-hole is located in a central region of the protective circuit module, and the second through-hole is located in a peripheral region of the protective circuit module.

10. The battery pack of claim 9, wherein the temperature sensing unit comprises a first temperature sensing unit adjacent to the first through-hole and a second temperature sensing unit adjacent to the second through-hole, and
the first temperature sensing unit senses higher temperatures than the second temperature sensing unit.

11. The battery pack of claim 1, wherein the temperature sensing unit comprises a chip thermistor.

* * * * *